United States Patent Office 2,910,362
Patented Oct. 27, 1959

2,910,362

PROCESS FOR PREPARING A WATER-DISPERSIBLE ALCOHOL-SOLUBLE PHOSPHATIDE COMPOSITION

Paul F. Davis, Chicago, and Herbert T. Iveson, Elmhurst, Ill., assignors to The Glidden Company, Cleveland, Ohio, a corporation of Ohio No Drawing. Application November 13, 1957
Serial No. 696,051

14 Claims. (Cl. 99—15)

This invention relates to edible water-dispersible alcohol-soluble phosphatide compositions which are bland in flavor and which can be used in combination with a variety of edible products to hasten and/or otherwise assist their dissolution or dispersion in water. The invention relates also to an improved method for preparing such phosphatide compositions so as to yield a palatable product which is characterized by a bland-to-pleasant flavor.

It has been found that water-dispersible alcohol-soluble phosphatide compositions are significantly helpful in promoting the dissolution and/or dispersion of various dry, sometimes powdery, food products when water is added to the latter. For example, dry skim milk solids, cocoa powder, whole milk solids, soya protein, etc. are known by common experience to be somewhat slow in mixing with water when solutions and/or dispersions thereof are desired. By adding to such powders small amounts of one or more of the present phosphatide compositions, uniform aqueous solutions and/or dispersions of the powders can be secured readily and quickly.

It has been found that for the above purposes, the alcohol-soluble phosphatide needs to be dispersed in a carrier which contains a small amount of water-soluble volatile solvent such as propylene glycol or glycerine. Propylene glycol is preferred.

In order to prepare a stable, uniform dispersion of the alcohol-soluble phosphatide in a carrier, at a high concentration in the latter, the phosphatide should be brought into contact with the carrier while the phosphatide moiety is still wet with the alcohol which was used to effect its separation from the alcohol-insoluble moiety of whole (natural) phosphatide. This method is described and claimed in copending application Serial No. 232,868, filed June 21, 1951, now Patent No. 2,849,318, the disclosure of which is here incorporated by reference. However, when the whole carrier is volatile, as is propylene glycol, difficulties arise in deodorizing the carrier-phosphatide dispersion. We have now found that such deodorizing difficulties can be avoided by first dispersing the alcohol-wet moiety in an edible, relatively nonvolatile triglyceride carrier at a higher-than-desired concentration therein, then deodorizing this dispersion, and finally reducing the deodorized dispersion to the desired concentration with the desired volatile solvent(s).

Accordingly, one object of this invention is to provide a fluid, deodorized alcohol-soluble phosphatide-carrier composition, the carrier of which, after deodorization, contains sufficient added propylene glycol and/or glycerine to render the whole composition water-dispersible.

Another object is to provide an improved process for preparing a bland, deodorized composition of the type described in the foregoing object.

These and related objects will be understood from the foregoing and following description of our invention.

As noted above, we have found that an edible polyol such as propylene glycol and/or glycerine, when used as a minor part of the carrier for an alcohol-soluble moiety of vegetable phosphatides, renders the whole composition water-dispersible. While the propylene glycol gives the composition an initial bitter-sweet flavor which is not objectionable when such compositions are used with various dry food products to improve their dissolution and/or dispersion, any off-flavor or odor in the moiety itself is objectionable. Hence, the problem has been to deodorize the phosphatide moiety to a condition as nearly free of off-flavor and odor as possible. In commercial practice, the alcohol-soluble moiety is recovered as an alcohol dispersion. If the alcohol is removed from the dispersion, as by heating in vacuum, the moiety is recovered in a form which is difficult to re-disperse in a selected carrier, such as the edible polyol(s). This problem can be overcome by adding the polyol(s) directly to the alcohol dispersion and then heating the solution in vacuum to remove a large part to most of the ethanol. Much polyol is lost in this treatment. Moreover, the volatility of the polyol makes it difficult to deodorize the alcohol-soluble moiety effectively unless high pressure is maintained during the deodorization. Such a pressure treatment of the solution is disadvantageous commercially. We therefore sought a more practical method which would accomplish the following objectives:

(1) Strip the ethanol from the original ethanol solution of the phosphatide moiety.

(2) Permit the moiety to be effectively deodorized to an essentially odor- and flavor-free condition.

(3) Retain the phosphatide moiety in a condition which would enable it to be stably dispersed in a carrier which contains added polyol in amounts sufficient to render the resulting dispersion water-dispersible.

(4) Give a final dispersion which is fluid and non-separating.

Consideration of these four objectives indicated that they could only be accomplished by stripping and deodorizing a relatively nonvolatile carrier dispersion of the phosphatide moiety, and finally adding the polyol(s). Since the resulting composition was required to be of edible quality, we recognized that the nonvolatile carrier could desirably be a triglyceride oil such as salad oil, margarine oil or like normally-liquid edible oils, portioned in relation to the moiety so as to give a deodorized dispersion somewhat pasty in character rather than fluid. Then addition of the polyol(s) would bring it to the desired fluid condition.

Thus, analysis of the problem led to our present process, already described briefly above. In practicing our improved process, we have found that deodorization of the phosphatide moiety can be effectively secured by employing any normally-liquid triglyceride as the deodorization carrier. We have also found, however, that while the resulting dispersion is bland in flavor, objectionable flavors are detected when the resulting polyol-containing dispersion is added to certain dry food products. For example, a taste panel can find a cottonseed or peanut oil dispersion (containing added polyol(s)) to be bland in flavor when tasted alone. When such dispersions are added to non-fat dry milk solids and the latter are reconstituted with water, as little as .25% of the added dispersion gives an easily detectable off-flavor. Because of this situation, the triglyceride oil of the carrier must be carefully chosen in reference to the food product with which it is intended to be used. We have found that for an all-purpose dispersion, the carrier oil should preferably be coconut oil or butter oil, or mixtures thereof. Moreover, the residual soy bean oil introduced through the phosphatide should be kept as low as possible, e.g., less than 15%.

The edible polyols noted above are added to the deodorized triglyceride oil dispersion in amounts between about 5% and 15% by weight. These amounts have been found to confer to the dispersion the desired quality of water-dispersibility. At these added levels of polyol(s), the triglyceride-phosphatide dispersion, after deodorization, should have an acetone-insoluble concentration between 65% and 73%. The phosphatide content of the finished dispersion containing added polyol can then be kept at a moderately high level, i.e., 58%–68%. Higher levels would, of course, be desirable, but we have found that when the triglyceride-phosphatide dispersion contains more than about 73% of acetone-insolubles, the dispersion is too viscous for efficient deodorization after the ethanol has been stripped off.

In a product meeting the foregoing requirements for efficient deodorization, we have found that if more than about 15% of polyol, e.g., propylene glycol, is added, there is a distinct tendency for separation to occur on long standing. Thus, for best shelf-life we prefer to add not more than about 15% of propylene glycol. Glycerine behaves similarly; however, we have found that when glycerine is used alone, the resulting dispersions are less fluid. We accordingly prefer propylene glycol or mixture of propylene glycol and glycerine.

The deodorized triglyceride oil-phosphatide dispersion is desirably protected against oxidative and other forms of flavor deterioration by adding a small amount of tocopherols. Mixed tocopherols are available as a commercial product (Tocopherols, Type 4-34, Distillation Products Industries), and such mixed tocopherols can be advantageously employed at a level of about 0.1%. Other stabilizers can, of course, be used for analogous functions.

The phosphatide of the triglyceride oil-phosphatide dispersion can be and desirably is bleached by adding a small amount of aqueous hydrogen peroxide (e.g., 1–3% of 27.5% $H_2O_2$) to the dispersion after the ethanol has been stripped off. Also at the same time, it is desirable to add a small amount of metal scavenger such as .1% of citric acid monohydrate. Citric acid is preferred over phosphates or pyrophosphates since it discharges a green color which is sometimes found in alcohol-soluble phosphatide moieties. As will be understood, deodorization follows the stripping off of ethanol.

For best shelf-life and dispersibility, and for best flavor in connection with dried milk products, our finished product is preferably a coconut oil-phosphatide-propylene glycol dispersion, the phosphatides of which have been treated with hydrogen peroxide, citric acid and mixed tocopherols. Such a product, or others conforming to the foregoing description, can be added to a variety of dry, generally powdered, food products in amounts between about .25 and 1–2% to improve the water dispersibility of the food products. The dispersion can be incorporated into the food product in any convenient manner, such as by mixing the dispersion with the food product with or without a subsequent grinding operation, or by spraying the needed quantity of the dispersion (after dilution with water) over the food product, and then drying the treated mass. A short heat treatment of the mass (e.g., 10 minutes at 70° C.) frequently helps to improve the dispersibility of the treated food product, but such treatment is optional. The amount of dispersion needed for optimum treatment of a particular food product or form of food product is best determined by a water-dispersibility test coupled with a flavor-panel test, but for general guidance the percentage range given above is likely to be found appropriate. Other qualities than ready-dispersibility are often affected by adding the dispersion to a food product. Thus, instant coffee is not only improved in dispersibility but foaming (when hot water is added) is diminished. In such instances, the optimum quantity of dispersion is apt to be different than where the dispersion is added to improve only one quality of the treated food product. For instant coffee, 0.5% of the dispersion (by weight) was added.

The following examples illustrate the process and include the best modes presently known to us for accomplishing the principles set forth above.

*Example 1*

An ethanol solution of alcohol-soluble moiety of soya phosphatides was prepared by extracting acetone-treated, oil-free whole phosphatides with ethanol. The solution was analyzed and found to contain 81.5% solids, of which 85% were alcohol-soluble lecithin. It was computed that 173 grams of this solution would need to be dispersed in 60 grams of corn oil (commercial product, "Mazola") to give a dispersion which could subsequently be diluted with propylene glycol to a composition analyzing 60% alcohol-soluble lecithin
30% corn oil
10% propylene glycol Accordingly, 173 grams of the ethanol solution and 60 grams of corn oil were mixed together and vacuum dried for 30 minutes at 170° F. to remove the ethanol. The hot mass was then deodorized at 15 mm. Hg and at 160–180° F. for 30 minutes and then cooled. The resulting dispersion had good odor and flavor and had no residual odor or flavor due to ethanol. It was of heavy body somewhat pasty in nature.

To 27 grams of the deodorized product was added 3 grams of propylene glycol. The resulting composition (sample 1) was fluid and had a slight bitter-sweet flavor due to the propylene glycol. It dispersed readily in water and conferred ready dispersibility to dry food products when added at a 0.5% level, by weight.

Similarly the following composition was prepared:

| Sample | Deodorized dispersion, g. | Added propylene glycol, g. |
|---|---|---|
| 2 | 25.5 | 4.5 |

It dispersed readily in an excess of water and conferred ready dispersibility to dry food products.

The two samples so prepared had the following analytical value:

| Sample | A-S lec.[1] | Oil | P.E.I.[2] | Propylene glycol | Color |
|---|---|---|---|---|---|
| | Percent | Percent | | Percent | |
| 1 | 48.0 | 42.5 | 0.0 | 9.5 | 0.6r–5.0y |
| 2 | 44.0 | 42.1 | 0.17 | 13.9 | 0.8r–6.0y |

[1] Alcohol-soluble lecithin.
[2] Petroleum ether insoluble.

*Example 2*

The corn oil of Example 1 was replaced with 60 grams of a mixture composed of 21 grams soybean oil and 39 grams of corn oil. After the mixture of alcohol-soluble lecithin solution and oils had been dried, 1 ml. of aqueous 27.5% hydrogen peroxide was added and the mass was deodorized under the conditions set forth in Example 1. The entire deodorized mass was then diluted with 20 grams of propylene glycol. The peroxide value of the resulting composition was 64. The composition had a good flavor and odor, was readily dispersible in water and was somewhat lighter in color due to the bleaching treatment with peroxide. Color 0.7r–5.0y.

*Example 3*

The composition prepared in Example 2 was fortified against oxidative deterioration by adding 0.1% by weight of mixed tocopherols (DPI type 4–34) to the dried oil-phosphatide dispersion prior to deodorizing the latter. The fortified composition dispersed readily in an excess of water.

Example 4

When the corn oil of Example 1 was replaced with margarine oil, cottonseed oil or peanut oil, equally satisfactory compositions were secured. The margarine oil was a mixture of refined soybean oil and refined cottonseed oil.

Example 5

A concentrated solution of alcohol-soluble lecithin (85%) in alcohol was used as starting material. Of the nonvolatiles, approximately 85% was acetone-insoluble. To 277 g. of the alcohol-soluble lecithin in alcohol was added 65 g. of liquid coconut oil. 0.3 g. citric acid (10% solution in propylene glycol) and 0.3 g. type 4–34 mixed tocopherols were added and the solution vacuum dried with the temperature reaching 80° C. During the vacuum drying, 200 g. of water was added to help remove residual solvent and polymers (acetone, mesityl oxide and alcohol). 3 ml. of 27.5% hydrogen peroxide was added and the composition steam deodorized for 1 hour at 80–85° C. and 16–17 mm. Hg pressure. To 36 grams of the deodorized product, 4 g. of propylene glycol was added.

The following examples illustrate the method used to prepare samples lower in soya bean oil.

Example 6

277 g. of the alcohol-soluble lecithin of Example 5 was extracted twice with 500 ml. portions of acetone. After decanting the acetone, 90 g. of butter oil, 0.3 g. citric acid in 15 cc. water and 0.3 g. type 4–34 mixed tocopherols were added. After vacuum drying to remove solvent, 3 ml. of 27.5% $H_2O_2$ was added, and the composition was deodorized for 1 hour at 80–85° C. and 17 mm. Hg pressure. Propylene glycol was added to the deodorized mass in amounts corresponding to 4 grams of propylene glycol to 36 grams of the mass.

Similar compositions were made substituting coconut oil and cottonseed oil in place of the butter oil.

Example 7

In taste-panel tests wherein dry milk solids were treated with various amounts of the dispersions of the foregoing examples, it was found that 0.75% of the coconut oil or butter oil dispersions was acceptable; i.e., gave no off-flavors. The peanut and cottonseed oil dispersions of Example 4 were detectable at a level of 0.25% due to an "oily flavor." In these tests, the various dispersions when tasted alone had bland, acceptable flavors.

Example 8

When the dispersion of Example 5 was used to treat malted milk, it was found that 0.5% was needed to give the product good water-dispersibility, and that best results at this level were secured by giving the treated product a heat-treatment of 10 minutes at 70° C.

From the foregoing examples and description of the invention, it will be apparent that our improved process can be used successfully to prepare a deodorized alcohol-soluble phosphatide dispersion of good flavor and odor, to which propylene glycol and/or glycerine can be added to impart water-dispersibility. The process can be applied to any of the available animal or vegetable phosphatides after freeing them of the alcohol-insoluble portion. Since soybean, corn and peanut phosphatides are most readily available as commercial products, we prefer to use them or mixtures of them.

The principles set forth hereinabove can be practiced successfully within the restrictions which have been set forth. Those skilled in the art will recognize that such practice can be varied considerably in diverse respects, many of which have not been specifically exemplified. Such variations as fall within the scope of the following claims are contemplated as being part of the invention.

Having described our invention, what we claim is:

1. The method of preparing an edible, deodorized water-dispersible dispersion of alcohol-soluble phosphatides in triglyceride oil which comprises the steps of: adding normally-liquid triglyceride oil to an alcohol-soluble extract of whole phosphatides while said extract is still wet with the extracting alcohol, the amount of added oil being sufficient to bring the acetone-insoluble content of the resulting mass to between about 65% and 73%; then drying said mass under conditions which expel most of the residual extracting alcohol without damaging the alcohol-soluble phosphatide of the mass; deodorizing the dried mass; and subsequently diluting the deodorized mass with between about 5% and 15% of edible polyol selected from the group consisting of propylene glycol, glycerine and mixtures thereof, all percentages being by weight.

2. The method as claimed in claim 1 wherein the added triglyceride oil is selected from the group consisting of liquid coconut oil and butter oil.

3. The method as claimed in claim 2 wherein the alcohol-soluble phosphatides have been extracted from whole vegetable phosphatides.

4. The method as claimed in claim 3 wherein the alcohol-soluble phosphatides have been extracted from whole soybean phosphatides.

5. The method as claimed in claim 4 wherein the added triglyceride oil is liquid coconut oil.

6. The method as claimed in claim 5 wherein the added polyol is propylene glycol.

7. The method as claimed in claim 6 wherein the diluted, deodorized mass has had a small stabilizing amount of mixed tocopherols added thereto.

8. The method as claimed in claim 1 wherein the added polyol is propylene glycol.

9. The method as claimed in claim 1 which includes the step of adding about 0.1% of citric acid monohydrate (by weight on the alcohol-soluble phosphatides) to the dried mass of alcohol-soluble phosphatide extract and added triglyceride oil in advance of deodorizing said mass.

10. The method as claimed in claim 9 wherein added triglyceride oil is selected from the group consisting of liquid coconut oil and butter oil.

11. The method as claimed in claim 10 wherein the added triglyceride oil is liquid coconut oil.

12. The method as claimed in claim 11 wherein the added polyol is propylene glycol.

13. The method as claimed in claim 12 wherein the diluted, deodorized mass has had a small stabilizing amount of mixed tocopherols added thereto.

14. In the preparation of a lecithin product, the steps of combining a normally-liquid triglyceride oil and an alcohol-soluble extract of whole phosphatides while said extract is still wet with the extracting alcohol, drying the combination under conditions which expel most of the residual extracting alcohol without damaging the alcohol-soluble phosphatide of the combination, deodorizing the combination by the application of elevated temperature and reduced pressure, and subsequently diluting the deodorized combination with an edible polyol selected from the group consisting of propylene glycol, glycerine, and mixtures thereof.

References Cited in the file of this patent

UNITED STATES PATENTS

| | | |
|---|---|---|
| 2,193,873 | Jordan | Mar. 19, 1940 |
| 2,555,972 | Karjala et al. | June 5, 1951 |
| 2,640,780 | Mattikow | June 2, 1953 |
| 2,773,771 | Julian et al. | Dec. 11, 1956 |